United States Patent [19]
van Duuren et al.

[11] 3,969,582
[45] July 13, 1976

[54] SYSTEM FOR AUTOMATIC SYNCHRONIZATION OF BLOCKS TRANSMITTING A SERIES OF BITS

[75] Inventors: Hendrik Cornelis Anthony van Duuren, Wassenaar; Herman da Silva, Voorburg, both of Netherlands

[73] Assignee: De Staat der Nederlanden, te Dezen Vertegenwoordigd Door de Directeur-Generaal der Posterijen, Telegrafie en Telefonie, Netherlands

[22] Filed: Dec. 20, 1974

[21] Appl. No.: 535,040

[30] Foreign Application Priority Data
Dec. 21, 1973 Netherlands............... 7317591

[52] U.S. Cl..................... 178/69.5 R; 340/146.1 D
[51] Int. Cl.²........................................... H04L 7/00
[58] Field of Search ........................ 178/69.5 R; 340/146.1 D; 328/63; 325/38 R

[56] References Cited
UNITED STATES PATENTS

| | | | |
|---|---|---|---|
| 3,336,467 | 8/1967 | Frey, Jr. | 340/146.1 D |
| 3,473,150 | 10/1969 | McClelland | 340/146.1 D |
| 3,576,947 | 5/1971 | Kruger | 340/146.1 D |
| 3,753,228 | 8/1973 | Nickolas et al. | 340/146.1 D |
| 3,796,956 | 3/1974 | Fudemoto et al. | 178/69.5 R |

*Primary Examiner*—Malcolm A. Morrison
*Assistant Examiner*—Errol A. Krass

[57] ABSTRACT

System for transmitting a series of bits with an indefinite length by transmitting and receiving between two stations parts of the series in balanced blocks and maintaining automatic synchronization of said blocks by generation of two types of similar framing blocks recognizable by a special signal in a fixed place in each framing block. These framing blocks also include the code number of the channel then to be transmitted. One type of framing block is generated when a loss of phase is detected in said bits at one station, which one type of framing block is continuously transmitted to the other station whereupon receipt thereof causes the generation of the other type of framing block at the other station. This other type of framing block then is continuously transmitted back to said one station, until it is detected at said one station indicating that reframing or synchronization has occurred, so traffic or information blocks can be and are resent again from said one station. Similarly, upon receipt of information blocks again at the other station from said one station, said other station restarts transmission of its information blocks.

12 Claims, 1 Drawing Figure

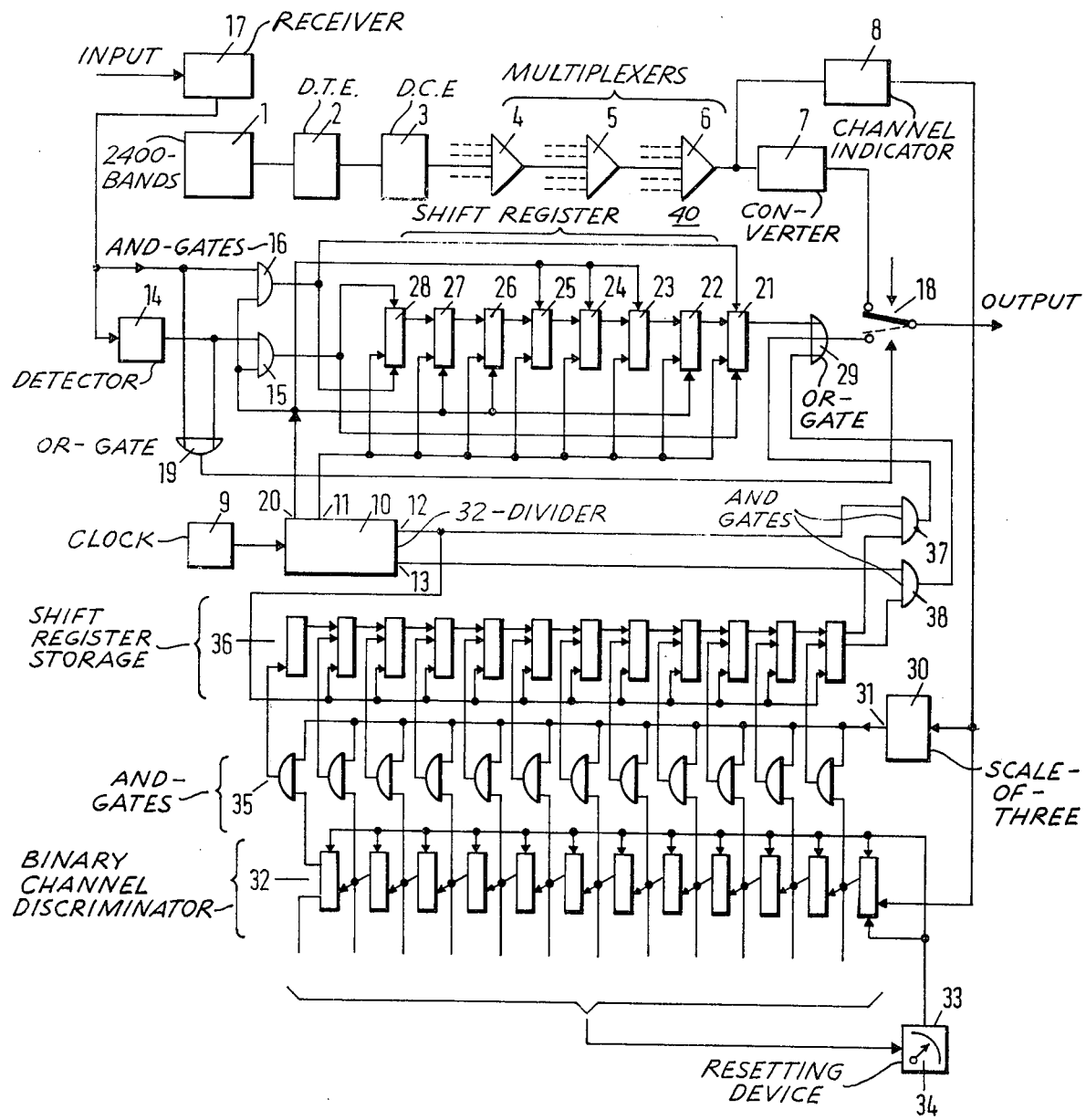

SYSTEM FOR AUTOMATIC SYNCHRONIZATION OF BLOCKS TRANSMITTING A SERIES OF BITS

|  | | $\beta$ | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| x | 100011 | $\bar{x}$ | a | $\bar{a}$ | b | $\bar{b}$ | c | $\bar{c}$ | d | $\bar{d}$ | e | $\bar{e}$ | f | $\bar{f}$ | g | $\bar{g}$ | h | $\bar{h}$ | i | $\bar{i}$ | j | $\bar{j}$ | k | $\bar{k}$ | l | $\bar{l}$ |
| bit positions 1 | 234567 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |

BACKGROUND OF THE INVENTION

The invention relates to a system for transmitting a series of bits with an indefinite length by transmitting parts of the series in five-bit signals, the five-bit signals being protected by a conversion into six-bit signals, five of these six-bit signals together with two additional bits forming a balanced block.

Such a system is described in the Netherlands patent application No. 7,307,959, published Dec. 10, 1974.

The 32-bit block according to this known technique is composed e.g. as follows:

|  | B1 | t1 | t2 | t3 | t4 | t5 | B2 |
|---|---|---|---|---|---|---|---|
| number of bits | 1 | 6 | 6 | 6 | 6 | 6 | 1 | a first bit B1, which is information dependent.

five-bit signals t1 through t5 with a constant ratio of (3), (4) or (2) according to the said Netherlands patent application No. 7,307,959.

a last bit B2, by which the block is balanced.

The signals t1 through t5 have resulted from the conversion of 5-bit signals into 6-bit signals, as described in the said patent application. In this case there are in addition to the 32 informative signals, three further (3) signals available, viz. the signals α, β, and γ. Consequently, these signals do not occur in the transmission of the information.

As soon as a synchronization of the blocks, called framing in what follows, has come about, it will only get lost in case of interruptions of a certain minimum length. The constant ratio (see the above-mentioned patent application) no longer exists in case of loss of phase, which is quickly ascertained, and the problem is how to restore the framing again in a quick way.

SUMMARY OF THE INVENTION

The invention provides a solution of the problem posed, because frame synchronization is brought about by means of a framing block, recognizable by a special signal in a fixed place.

Preferably the said two additional bits, which have opposite values, take the bit positions 1; 8 in the framing block and the special signal takes the bit positions 2 to 7; the bits in the odd bit positions 9 to 31 give a binary representation of the channel number with which the block would begin, if it were a traffic information block; and the bits in the even bit positions 10 to 32 represent the same channel number in an inverted way.

According to the invention one of the three available signals α, β, and γ from the 5-to 6-bit conversion namely, signal β (100011) is the special signal transmitted in the frame signal position t1, thus indicating that the block is a framing block. This framing block is composed as follows.

a first bit x, which is information dependent.

the signal β, characterizing the block as a framing block.

a bit $\bar{x}$, which is the inverse of the first bit.

Thus the first 8 bits of the framing block are balanced.

In the odd bit positions 9. 11, 13, 15, 17, 19, 21, 23, 25, 27, 29, and 31 a binary representation is given of the channel number by the bits a to 1. The block would begin with this channel number, if it were a traffic information block.

In the even bit positions 10, 12, 14, 16, 18, 20, 22, 24, 26, 28, 30 and 32 a binary representation of the same channel number is given in an inverted way by the bits $\bar{a}$ to $\bar{1}$.

Thus the second part of the framing block containing bits 9 to 32 too and, consequently, the whole framing block is balanced.

When a station has lost phase, it asks for the frame-positioning procedure by sending out itself the framing block. In this case, in which frame restoration is asked for, the bit $\bar{x}$ (bit position 1) is given the 0-value. Then the bit x (bit position 8) has the 1-value. This block, formed by 0β1 and the correct channel number, is continually repeated until an answer is received in the form of blocks consisting of 1β0 and the correct channel number. On receipt of the framing answer and the restoration of the correct frame position, the framing blocks are replaced by information blocks, which is answered by the other side by replacing, there too, the framing blocks by information blocks.

By utilizing the signals α and γ other blocks not forming part of the information to be transmitted can be used for further internal signalling purposes.

BRIEF DESCRIPTION OF THE VIEW

The above mentioned and other features, objects and advantages, and a manner of obtaining them are described more specifically below by reference to an embodiment of this invention shown in the accompanying drawing, wherein:

The accompanying figure represents a schematic block wiring diagram of a preferred embodiment of this invention.

This embodiment starts from a 2400 - band peripheral circuit 1. Eight - bit information signals have to be transmitted, which for that purpose are converted in a DTE (Data Terminal Equipment) circuit 2 into 10-bit signals according to a so-called envelope system, in which a state bit and a synchronizing or framing bit are added to the 8 bits. Via a DCE (Data Circuit Terminating Equipment) circuit 3 used for synchronization, the envelopes are led to a multiplexer 4. Consequently, the signals offered to the multiplexer 4 have a transmission speed of 10/8 × 2400 = 3000 baud. The multiplexer 4 together with the multiplexers 5 and 6 interlace e.g. 4 × 5 × 5 = 100 channels of 3000 baud to an aggregate signal of 300 k baud consisting of an uninterrupted series of bits. The channels in this series are indicated by a channel indicator 8. In the way as described in the Netherlands patent application No. 7,307,959, a conversion of the uninterrupted series of bits takes place into signal blocks of 32 bits, starting from 30 bits (see convertor 7 which changes three (8 + 2) bit signals into a balanced and protected block of 32 bits), so that a base band transmission can be applied to a secondary group with a transmission speed of 32/30 × 300 k baud = 320 k baud. A secondary group forms part (240 kHz) of the frequency spectrum in a telephony band, which spectrum comprises five primary groups of 48 kHz each.

A pulse is generated at the beginning of each of the channel envelopes in the multiplexed output signal of the multiplexer 6.

The pulses of a clock 9 are counted in a 32-divider 10 and grouped into cycles of 32 bits. Thus a pulse series marking the bit positions 1 to 8 of the bit stream to be transmitted, is found at an output terminal 11 as divider 10; a pulse series marking the bit positions 9, 11, 13, 15, 17, 19, 21, 23, 25, 27, 29 and 31 is found at an output terminal 12 as divider 10, and a pulse series marking the bit positions 10, 12, 14, 16, 18, 20, 22, 24, 26, 28, 30 and 32 is found at an output terminal 13 as divider 10.

If loss of phase has been detected by a detector 14, a condition for a pulse to pass will appear at a gate 15; and if a framing block is asked for via a receiver 17, a condition for a pulse to pass will appear at a gate 16.

Loss of phase is detected, if the constant ratio is not found in the information block; and a request for a framing block is made, if the first 8 bits in a 32-bit block received exhibit the configuration 01000111. or 0β1. This request configuration does not occur in the first 8 bits of a block in the information transmission state. Thus when either of these conditions occurs, switch 18 is changed over from the information transmission state position (full line) to the reframing state position (dotted line) via an OR-gate 19.

When a loss of phase is detected and a request for a framing block is to be made, a pulse at an output terminal 20 of the divider 10 appears just before the appearance of the pulse at the output terminal 11, which sets up the configuration

| 28 | 27 | 26 | 25 | 24 | 23 | 22 | 21 |
|---|---|---|---|---|---|---|---|
| 0 | 1 | 1 | 0 | 0 | 0 | 1 | 1 | in triggers 21 through 28 of a shift register 40, or the frame request signal 1β0 (reading bits backwards as they are stepped out of the register 40 from left to right). If, however, reframing takes place in reply to a request for reframing, the configuration will be

| 28 | 27 26 25 24 23 22 | 21 |
|---|---|---|
| 1 | 1 1 0 0 0 1 | 0 | in these triggers of the shift register 40 or the synchronized framing signal 0β1 The 8 pulses of the output terminal 11 cause this information to pass from the register via an OR-gate 29 and the switch 18 to the output line.

At the beginning of the introduction of a channel envelope into the multiplex signal, a pulse is generated in the channel indicator 8. This pulse is transmitted to a scale-of-three circuit 30 delivering a pulse to an output terminal 31 every three channels of signals of 10 bits per channel. Thus this pulse appears every time a channel is transmitted as the first channel of the three channels in the 32-bit block. The same channel introduction pulse, which is led to the scale-of-three circuit 30, controls a binary circuit 32, which can discriminate between 4096 channels ($2^{12}$) at the most.

In this example only 100 channels are multiplexed. The output terminals of twelve triggers of the binary circuit 32 are connected to a resetting device 33, in which the number of channels to be multiplexed is fixed, in this example 100, by means of a selecting switch 34. In the position 101, which has to indicate channel 1 again, the configuration of the 1/0 states of the triggers of the circuit 32 will be 000001100101 corresponding to the binary number for one hundred and one. Under this condition, as determined by the switch 34, a pulse appears, which resets the circuit 32 into the state 000000000001, corresponding to the channel indication 1.

Any time a pulse appears at the output terminal 31, the states of the triggers of the circuit 32 are stored in a shift register 36 via AND-gates 35, so this takes place at the beginning of the transmission of every successive or next block of 32 bits.

The pulses at the output terminal 12 of the divider 10 shift the contents of the shift register 36, and with the aid of the odd bit pulses of the bit positions 9 to 31 the information is offered to the line via an AND-gate 37 and the OR-gate 29 to form the framing block when required.

The pulses at the output terminal 13 of the divider 10 beginning with those of the bit position 10, and so on for the even bit, send the inverted value of the preceding bit via an AND-gate 38 and the OR-gate 29 to the output line. Thus each bit, after the eighth bit in the block, which is obtained from the shift register 36, is followed by the inverted value of that bit, and the information transmitted represents in binary valves the number of the first channel of the 32 bits.

While there is described above the principles of this invention in connection with specific apparatus, it is to be clearly understood that this description is made only by way of example and not as a limitation to the scope of this invention.

What is claimed is:

1. In a system for transmitting and receiving a continuous series of binary information bits of an indefinite length between two stations, wherein said series is divided into balanced blocks of a predetermined number of bits, the improvement comprising automatically maintaining synchronism of said blocks of signals communicated between said stations, comprising:
   A. detecting an out-of-balance in the bits in said blocks received at one station,
   B. generating and transmitting one special balanced framing block of bits at said one station in response to said out-of-balance detection, said special framing block having bits in specific locations therein for its identification and synchronization,
   C. receiving and detecting at the other station said one special framing block signal,
   D. generating and transmitting at said other station another special framing block of bits in response to the detection of said one special framing block,
   E. receiving and detecting said other special framing block at said one station indicating the reestablishment of synchronism, F. switching from transmission of one special framing block to information blocks at said one station on receipt of said other framing block, and G. switching from transmission of said other framing blocks to information blocks at said other station when said information blocks from said one station are received at said other station.

2. A system according to claim 1 wherein each of said blocks comprising 32 binary bits.

3. A system according to claim 1 wherein two of the bits in said framing blocks are given special locations in said blocks.

4. A system according to claim 1 wherein inversion of said two bits indicates the difference between said one and said other framing blocks.

5. A system according to claim 1 wherein said framing block contains a special signal of bits indicating synchronization required.

6. A system according to claim 1 wherein said framing blocks include a signal indicating the number of the channel being communicated when synchronization was requested.

7. A system according to claim 6 wherein said signal indicating the number of the channel comprises the same signal in odd and even numbered bits in said framing blocks, but said even buts are of opposite polarity to their corresponding odd bits.

8. A system according to claim 1 wherein said special signal in said framing blocks is bracketed by two opposite polarity bits indicating said special location for synchronization.

9. A system for transmitting and receiving a continuous series of binary bits of indefinite length between two stations, wherein said series is divided into balanced blocks of a predetermined number of bits, the improvement comprising means for automatically maintaining synchronization of said blocks of signals communicated between said stations, each station comprising:

A. means for detecting an out-of-balance in the blocks received,

B. shift register means for generating one special framing block in response to an out-of-balance detection by said detecting means, C. receiving means for detecting special framing block signals, D. shift register means for generating another special framing block in response to the receipt of said one special framing block, E. switching means for transmitting said one special framing block signal until said other framing block is received, and then retransmitting information blocks indicating that synchronization has been reestablished.

10. A system according to claim 9 wherein said shift register means comprise a first shift register for generating a special service signal and a second shift register for generating a signal for the number of the channel being communicated when the synchronization was requested.

11. A system according to claim 10 including a clock and a divider circuit for controlling said first and second shift registers.

12. A system according to claim 10 including means for re-setting said second shift register.

* * * * *

UNITED STATES PATENT OFFICE
CERTIFICATE OF CORRECTION

Patent No. 3,969,582     Dated July 13, 1976

Inventor(s) Hendrik Cornelis Anthony Van Duuren et al.

It is certified that error appears in the above-identified patent and that said Letters Patent are hereby corrected as shown below:

| | |
|---|---|
| Column 2, line 30 | change " $\bar{x}$ " to - - x - - |
| Column 2, line 31 | change " x " to - - $\bar{x}$ - - |
| Column 2, line 53 | change "band" to - - baud - - |
| Column 3, line 18 | change "as" to - - of - - |
| Column 3, line 21 | change "as" to - - of - - |
| Column 3, line 23 | change "as" to - - of - - |
| Column 4, line 34 | before " , " insert - - pulses - - |
| Column 4, line 39 | change "valves" to - - values - - |
| Column 5, line 26 | change "buts" to - - bits - - |

Signed and Sealed this

Fourth Day of January 1977

[SEAL]

Attest:

RUTH C. MASON
*Attesting Officer*

C. MARSHALL DANN
*Commissioner of Patents and Trademarks*